United States Patent [19]
Koido et al.

[11] Patent Number: 6,016,369
[45] Date of Patent: Jan. 18, 2000

[54] IMAGE GENERATION METHOD AND APPARATUS

[75] Inventors: Yasuhiro Koido; Sanchi Nakayama, both of Kanagawa, Japan

[73] Assignee: NEC Corporation, Tokyo, Japan

[21] Appl. No.: 08/997,607

[22] Filed: Dec. 23, 1997

[30] Foreign Application Priority Data

Jan. 16, 1997 [JP] Japan .................................. 9-005373

[51] Int. Cl.⁷ .................................................... G06K 9/32
[52] U.S. Cl. .......................... 382/298; 382/304; 382/307; 345/193; 345/511; 345/515; 345/516; 711/100; 711/105; 711/111; 711/112
[58] Field of Search ..................... 382/298, 304, 382/307; 711/100, 105, 111, 112; 345/193, 511, 515, 516

[56] References Cited

U.S. PATENT DOCUMENTS

| | | | |
|---|---|---|---|
| 5,400,057 | 3/1995 | Yin | 345/199 |
| 5,765,187 | 6/1998 | Shimizu et al. | 711/110 |
| 5,867,593 | 2/1999 | Fukuda et al. | 382/176 |

FOREIGN PATENT DOCUMENTS

| | | |
|---|---|---|
| 61-80339 | 4/1986 | Japan . |
| 63-292376 | 11/1988 | Japan . |
| 7-220059 | 8/1995 | Japan . |

*Primary Examiner*—Leo H. Boudreau
*Assistant Examiner*—Kanji Patel
*Attorney, Agent, or Firm*—Young & Thompson

[57] ABSTRACT

An image generation apparatus of the present invention reduces the write access frequency to a plurality of memories and increases the image generation speed. The image generation apparatus divides an image zone into a plurality of blocks and assigns an address for each pixel within a block. In order to store the pixels within a shortened time, a parallel storing of the pixel shall be performed evenly at the grouping stage for storing them into respective FIFOs in accordance with the difference of the least significant bit of the address data of the pixel. In this case, the present invention bisects the binary address signal into high order address bits and low order address bits, takes an exclusive OR among the least significant bits of high and low order address bits and replace the least significant bit of the low order address bits with the result of the exclusive OR for the grouping discrimination sign. This grouping avoids the unbalanced grouping for the pixels on the border line of image by reverting the least significant bit at every another longitudinal level.

4 Claims, 7 Drawing Sheets

| WRITING SEQUENCE | DRAM7 | DRAM8 |
|---|---|---|
| 1 | 06h | 05h |
| 2 | 0Eh | 0Dh |
| 3 | 16h | 0Fh |
| 4 | 1Eh | 15h |
| 5 | 26h | 17h |
| 6 | 2Eh | 1Dh |
| 7 | 36h | 1Fh |
| 8 | 3Eh | 25h |
| 9 | | 27h |
| 10 | | 2Dh |
| 11 | | 2Fh |
| 12 | | 35h |
| 13 | | 37h |
| 14 | | 3Dh |
| 15 | | 3Fh |

| WRITING SEQUENCE | DRAM7 | DRAM8 |
|---|---|---|
| 1 | 01h | 08h |
| 2 | 02h | 09h |
| 3 | 03h | 0Ah |
| 4 | 04h | 0Bh |
| 5 | 05h | 0Ch |
| 6 | 06h | 0Dh |
| 7 | 07h | 0Eh |
| 8 | 10h | 0Fh |
| 9 | 11h | |
| 10 | 12h | |
| 11 | 13h | |
| 12 | 14h | |
| 13 | 15h | |
| 14 | 16h | |
| 15 | 17h | |

| WRITING SEQUENCE | DRAM7 | DRAM8 |
|---|---|---|
| 1 | 06h | 05h |
| 2 | 0Ch | 0Fh |
| 3 | 0Eh | 15h |
| 4 | 16h | 17h |
| 5 | 1Ch | 1Fh |
| 6 | 1Eh | 25h |
| 7 | 26h | 27h |
| 8 | 2Ch | 2Fh |
| 9 | 2Eh | 35h |
| 10 | 36h | 37h |
| 11 | 3Ch | 3Fh |
| 12 |  | 3Eh |

| WRITING SEQUENCE | DRAM7 | DRAM8 |
|---|---|---|
| 1 | 02h | 09h |
| 2 | 04h | 0Bh |
| 3 | 06h | 0Dh |
| 4 | 01h | 0Fh |
| 5 | 03h | 08h |
| 6 | 05h | 0Ah |
| 7 | 07h | 0Ch |
| 8 | 10h | 0Eh |
| 9 | 12h | 19h |
| 10 | 14h | 1Bh |
| 11 | 16h | 1Dh |
| 12 |  | 1Fh |

IMAGE GENERATION METHOD AND APPARATUS

BACKGROUND OF THE INVENTION

1. Field of the Invention

The present invention relates to an image generation method and an apparatus, and more particularly to an image generation method and an apparatus comprising a plurality of DRAMs for storing data separately corresponding to respective pixels on a screen.

2. Description of the Invention

Hitherto, an image generation apparatus of this kind has a memory for storing data which correspond to respective pixels, and competence of memory interface for transferring the pixel data controls mainly the speed of the image generation. Therefore, from one aspect, it has been necessary to use the memory of a high transfer rate, but due to an expensive cost of the high speed memory, it has been required to use such as a DRAM which can be obtained at a lower price.

However, since the access speed of these DRAMs are slow, a new method is employed to meet the problem such that a screen is divided into rectangular areas to be obtained through $2^x$ by $2^y$ division of longitudinal and lateral ways, and assigns consecutive address numbers for pixels in the same low within a block, data corresponding to respective pixels are distributed to a plurality of DRAMs corresponding to a least significant bit of its low order address and then stored.

FIG. 1 is a partial block diagram showing an example of a structure of a conventional image generation apparatus at the write control time of the memory.

The conventional image generation apparatus comprises pixel processing unit 1, memories consisting of DRAMs 7 and 8, address FIFOs 3 and 4, data FIFOs 5 and 6, and memory controller 9, and memory controller 9 operates at the write control time of the memory.

Pixel processing unit 1 generates address signal 50 and data signal 51 for each block corresponding to each pixel in an image on a screen, and outputs thus generated signals pixel by pixel together with write request signal 52, and also outputs block processing completion signal 63 when the processing of one block is finished. DRAMs 7 and 8 receive address signals 59, 60 and data signals 61, 62 from address FIFOs 3, 4 and data FIFOs 5, 6, and then these signals are write-controlled at the same timing in accordance with DRAM control signals 57, 58.

Address FIFOs 3, 4 divide and temporarily hold address signal 50 in accordance with input control signals 54, 55, and output address signals 59, 60 to DRAMs 7, 8 at the same timing in accordance with output control signal 56 from memory controller 9.

Data FIFOs 5, 6 divide and temporarily hold data signal 51 in accordance with input control signals 54, 55, and output data signals 61, 62 to DRAMs 7, 8 in accordance with output control signal 56 from memory controller 9.

Memory controller 9 receives address signal 50 and write request signal 52, and outputs input control signal 54 when the least significant bit of address signal 50 is 0 and write request signal 52 becomes effective. On the other hand, memory controller 9 outputs input control signal 55 when the least significant bit of address signal 50 is 1 and write request signal 52 becomes effective. Memory controller 9 also outputs output control signal 56 and DRAM control signals 57, 58 when address FIFOs 3, 4 have data held therein and DRAMs 7, 8 are in writable conditions. Further, memory controller 9 outputs output control signal 56 and DRAM control signals 57, 58 so that data remained in address FIFOs 3, 4 and data FIFOs 5, 6 may be outputted to DRAMs 7, 8 when block processing completion signal 63 becomes effective.

The operation of the conventional image generation apparatus at the write control time of the memory is described hereinafter.

FIG. 2 is an arrangement diagram showing column-address arrangement example 1 in a block of the conventional image generation apparatus shown in FIG. 1. Here, a block is divided into rectangular segments through $2^3$ by $2^3$ division of longitudinal and lateral ways, a column address of the block has bus width of 3+3=6 bits, bisecting to a high order 3 bits and a low order 3 bits and they are assigned to a longitudinal address and a lateral address, respectively, and the least significant bit (the first bit) of the lateral address of the block is used as discrimination bit (the low order address) which selects DRAM 7 or 8. For explanation of the operation, we assume a case where address data of each segment of block 17 included in superposed image 16 are written on DRAMs 7, 8.

First, in pixel processing unit 1, address signals 50 which correspond to pixels in image 16 on the screen are produced from upper left in the order of 05h, 06h, 0Dh, 0Eh, 0Fh, 15h, 16h, - - - , 37h, 3Dh, 3Eh, 3Fh and are outputted pixel by pixel together with data signal 51 and write request signal 52.

At this time, in memory controller 9, input control signal 54 is outputted when the lateral least significant bit (the first bit) of address signal 50 is 0 such as 06h, 0Eh, - - - , 3Eh and also write request signal 52 becomes effective. Then address signal 50 and data signal 51 are temporarily retained in address FIFO 3, data FIFO 5 in the address order such as 06h, 0Ch, - - - , 3Eh. On the other hand, when the lateral least significant bit (the first bit) of address signal 50 is 1 such as 05h, 0Dh, 0Fh, - - - , 3Fh and also write request signal 52 becomes effective, input control signal 55 is outputted and address signal 50 and data signal 51 are temporarily held in address FIFO 4 and data FIFO 6 in the order of the address such as 05h, 0Dh, 0Fh, - - - , 3Fh.

Next, in memory controller 9, when there are data in FIFOs 3, 4 and at the same time DRAMs 7, 8 are in writable conditions, output control signal 56 and DRAM control signals 57, 58 are outputted. Now, when there is data in one of FIFOs 3, 4, then only one of DRAM control signals 57, 58 is outputted. Then, in accordance with output control signal 56, address signal 59 and data signal 61 are outputted in order from address FIFO 3 and data FIFO 5 to DRAM 7, and concurrently address signal 60 and data signal 62 are outputted in order from address FIFO 4 and data FIFO 6 to DRAM 8, and also DRAMs 7, 8 are write-controlled at the same timing according to DRAM control signals 57, 58.

Subsequently, in pixel processing unit 1, block processing completion signal 63 is outputted when the processing of one block is finished. When this block processing completion signal 63 becomes effective, output control signal 56 and DRAM control signals 57, 58 are outputted from memory controller 9, and data remained in address FIFOs 3, 4 and data FIFOs 5, 6 are outputted to DRAMs 7, 8 to be stored.

FIG. 3 is an explanation diagram showing an example of write access operation conducted to DRAMs 7, 8 under the column-address arrangement shown in FIG. 2, illustrating write access order to each DRAM 7, 8 and a column address of each DRAM 7, 8. Here, although columns for write access to DRAM 7 in ninth to fifteenth times are recorded as unused, this means that DRAM control signal 57 is not issued and any write operation is not conducted to DRAM 7 at the corresponding time.

FIG. 4 is an arrangement diagram showing column-address arrangement example 2 in a block of the conventional image generation apparatus of FIG. 1.

The image area is divided into rectangular areas through $2^3$ by $2^3$ division in longitudinal and lateral ways and column address of a lateral order address in a block has bus width of 3+3=6 bits, bisecting to the high order 3 bits and the low order 3 bits and they are assigned to a longitudinal address bits and a lateral address bits, respectively, and the least significant bit (the first bit) of the lateral address bits is used as discrimination bit (the low order address) which selects DRAM 7 or 8.

For explanation of the operation, we assume a case where address data of each pixel of block 19 included in superposed image 18 are written on DRAMs 7, 8.

First, in pixel processing unit 1, address signals 50 which correspond to pixels in image 18 on the screen are produced from upper left in the order of 01h, 02h, 03h, 04h, 05h, 06h, 07h, 08h, - - - , 14h, 15h, 16h, 17h and are outputted pixel by pixel together with data signal 51 and write request signal 52.

At this time, in memory controller 9, input control signals 54 are outputted when the longitudinal least significant bit (the fourth bit) of address signal 50 is 0 such as 01h, 02h, - - - , 06h, 07h, 10h, - - - , 17h and also write request signal 52 becomes effective. Then address signal 50 and data signal 51 are temporarily held in address FIFO 3, data FIFO 5 in the address order such as 01h, 02h, 03h, 04h, - - - , 17h. On the other hand, when the longitudinal least significant bit (the fourth bit) of address signal 50 is 1 such as 09h, 0Ah, 0Bh, - - - , 0Fh and also write request signal 52 becomes effective, input control signal 55 is outputted and address signal 50 and data signal 51 are temporarily held in address FIFO 4 and data FIFO 6 in the order of the address such as 09h, 0Ah, 0Bh, - - - , 0Fh.

Next, in memory controller 9, when there are data in FIFOs 3, 4 and at the same time DRAMs 7, 8 are in writable conditions, output control signal 56 and DRAM control signals 57, 58 are outputted. Now, when there is data in one of FIFOs 3, 4, then only one of DRAM control signals 57, 58 is outputted. Then, in accordance with output control signal 56, address signal 59 and data signal 61 are outputted in order from address FIFO 3 and data FIFO 5 to DRAM 7, and concurrently address signal 60 and data signal 62 are outputted in order from address FIFO 4 and data FIFO 6 to DRAM 8, and also DRAMs 7, 8 are write-controlled at the same timing according to DRAM control signals 57, 58.

Subsequently, in pixel processing unit 1, block processing completion signal 63 is outputted when the processing of one block is finished. When this block processing completion signal 63 becomes effective, output control signal 56 and DRAM control signals 57, 58 are outputted from memory controller 9, and data remained in address FIFOs 3, 4 and data FIFOs 5, 6 are outputted to DRAMs 7, 8 to be stored.

FIG. 5 is an explanation diagram showing an example of write access operation conducted to DRAMs 7, 8 under the column-address arrangement shown in FIG. 4, illustrating write access order to each DRAM 7, 8 and a column address of each DRAM 7, 8. Here, although columns for write access to DRAM 8 are recorded as unused in ninth to fifteenth times, this means that DRAM control signal 58 is not issued and any write operation is not conducted to DRAM 8 at the corresponding time.

In the conventional image generation apparatus, a longitudinal and a lateral address in a block are assigned to a column address of DRAM 7, DRAM 8, and according to the least significant bit of the longitudinal address or the lateral address, it is determined which of DRAM 7 or DRAM 8 is to be selected and assigned. Therefore, on the boundary of the block, there reside pixels which perform one-side access to either of DRAM 7 or DRAM 8, and hence some of columns of DRAM 7 or DRAM 8 remain unused. Consequently, when an image is produced on the address space on the DRAM demarcated by the block, a number of one-side access to DRAM 7 or DRAM 8 are generated resulting in a problem of unbalanced access frequency so that it makes a slow image generation during an extended time period.

SUMMARY OF THE INVENTION

An object of the present invention is to reduce the write access frequency with reference to a plurality of memories to achieve image generation in a reduced time.

An image generation apparatus of the present invention comprises a pixel processing unit for dividing an image area into a plurality of rectangular blocks, producing address signals for said each pixels within a block, the address signal comprising longitudinal and lateral address signals in each said block corresponding to each pixel in the image of said image area and following to the address signals pixel data are outputted pixel by pixel; memory means including a plurality of DRAMs for dividing and storing each data which corresponds to said each pixel in accordance with the low order address signal of said address signals, said DRAM being write-controlled at the same timing; a plurality of FIFO means for storing said divided address signal and said pixel data signal at the write control time of the memory means corresponding to said least significant bit of the low order address signals for every one of said plurality of DRAMs and temporarily holding thereof to output at the same timing to said plurality of DRAMs, respectively; and a low order address conversion circuit for receiving said address signal and performing logical operation among the least significant bits of said longitudinal address signal and said lateral address signal to convert the lateral order address signal and output the converted low order address signal.

Further, said low order address conversion circuit comprises an exclusive OR circuit for performing logical operation of the least significant bit of said lateral address signal through exclusive OR with the least significant bit of said longitudinal address signal and outputting the result of the logical operation as the low order address signal.

Further, said low order address conversion circuit comprises an exclusive OR circuit for logical operation of the least significant bit of said longitudinal address signal through the exclusive OR with the least significant bit of said lateral address signal and outputting thereof as the low order address signal. BRIEF DESCRIPTION OF THE DRAWINGS

[FIG. 1]

A partial block diagram of a structure example of the conventional image generation apparatus shown at the write control time of the memory.

[FIG. 2]

An arrangement diagram showing column-address arrangement example 1 in the block of the image generation apparatus in FIG. 1.

[FIG. 3]

An explanatory diagram showing an example of write access operation applied to DRAMs 7, 8 under column-address arrangement 1 shown in FIG. 2.

[FIG. 4]

An arrangement diagram showing column-address arrangement example 2 in the block of the image generation apparatus in FIG. 1.

[FIG. 5]

An explanatory diagram showing an example of write access operation applied to DRAMs 7, 8 under column-address arrangement. 2 shown in FIG. 4.

[FIG. 6]

A partial block diagram showing a structure of a first embodiment according to an image generation apparatus of the present invention at the write control time of the memory.

[FIG. 7]

A circuit diagram showing a low order address conversion circuit in the image generation apparatus of FIG. 6.

[FIG. 8]

An arrangement diagram showing an example of a column-address arrangement in a block of the low order address conversion circuit in FIG. 7.

[FIG. 9]

An explanatory diagram showing an example of write access operation applied to DRAMs 7, 8 under the column-address arrangement shown in FIG. 8.

[FIG. 10]

A circuit diagram showing a low order address conversion circuit in embodiment 2 of the image generation apparatus of the present invention.

[FIG. 11]

An arrangement diagram showing an example of a column-address arrangement in the block of the low order address conversion circuit in FIG. 10.

[FIG. 12]

An explanatory diagram showing an example of write access operation applied to DRAMs 7, 8 under the column-address arrangement shown in FIG. 11.

[FIG. 13]

A block diagram showing a showing a structure of a 2nd embodiment of the present invention.

An explanatory diagram showing an example of write access operation applied to DRAMs 7, 8 under column-address arrangement 1 shown in FIG. 2.

DESCRIPTION OF THE PREFERRED EMBODIMENT

An embodiment of the present invention will be described with reference to the drawings.

Figure 6:
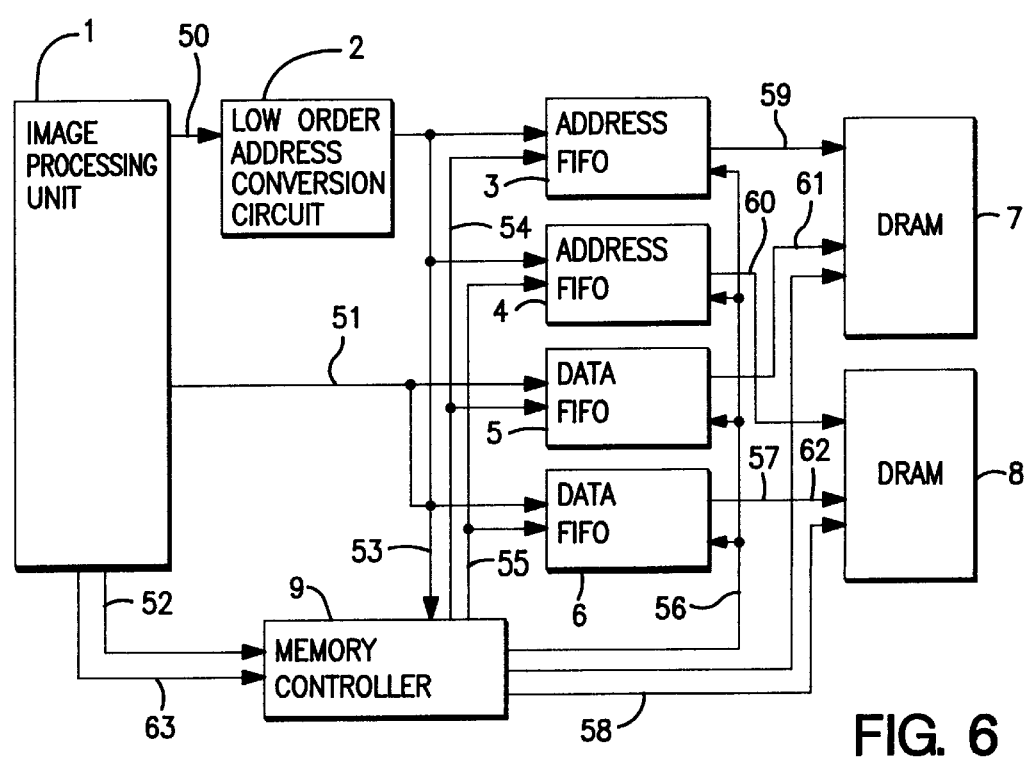

FIG. 6 is a partial block diagram illustrating a structure example of a first embodiment of an image generation apparatus according to the present invention at the write control time of the memory.

Figure 1:
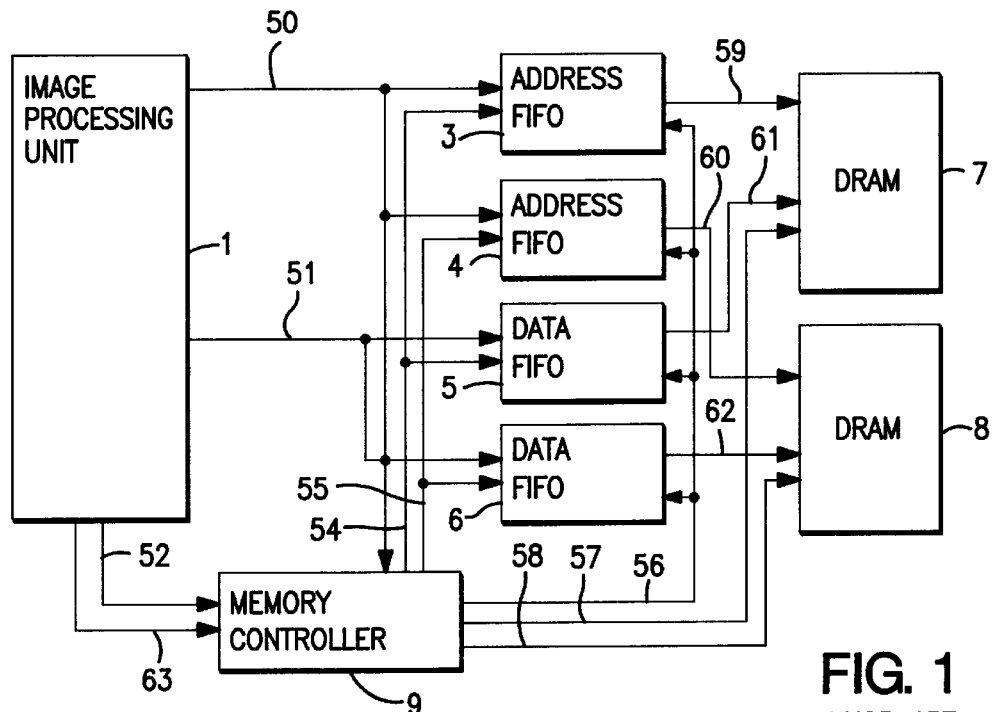

Referring to FIG. 6, in the image generation apparatus of the present embodiment, pixel processing unit 1, memories composed of DRAMs 7, 8, address FIFOs 3, 4, data FIFOs 5, 6, memory controller 9 and low order address conversion circuit 2 operate at the write control time of the memory. Here, pixel processing unit 1, DRAMs 7, 8, address FIFOs 3, 4, data FIFOs 5, 6, and memory controller 9 are similar to those of the conventional image generation apparatus shown in FIG. 1, and hence explanation for them is omitted.

Low order address conversion circuit 2 which is a characteristic of the present invention receives address signals from pixel processing unit 1, performs logical operation of the low order bit signal of each longitudinal address signal or a lateral pixel address signal within a block, and outputs thereof as the low order address signal for selecting DRAM 7 or DRAM 8 which divides and stores each data corresponding to each pixel. This low order address signal controls DRAMs 7, 8, address FIFOs 3, 4 and data FIFOs 5, 6 through memory controller 9.

Figure 7:
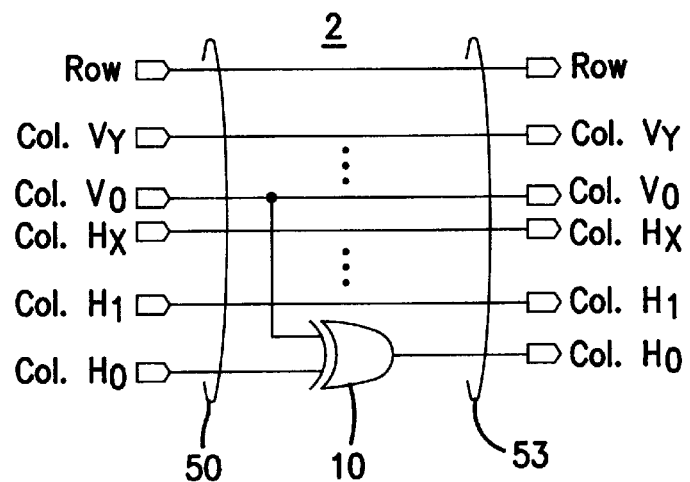

FIG. 7 is a circuit diagram showing an example of a detailed structure of low order address conversion circuit 2. Referring to FIG. 7, this low order address conversion circuit 2 provides EXOR (Exclusive OR) circuit 10 and outputs address signal 53 which instructs to perform logical operation of the least significant bit $H_0$ of the lateral address signal (low order X bits of column-address) in the block through exclusive OR with the least significant bit signal $V_0$ of the longitudinal address signal (high order Y bits of column-address), and converts to the low order address signal.

Next, operation of the write control of the image generation apparatus of the present embodiment is described hereinafter.

Figure 8:
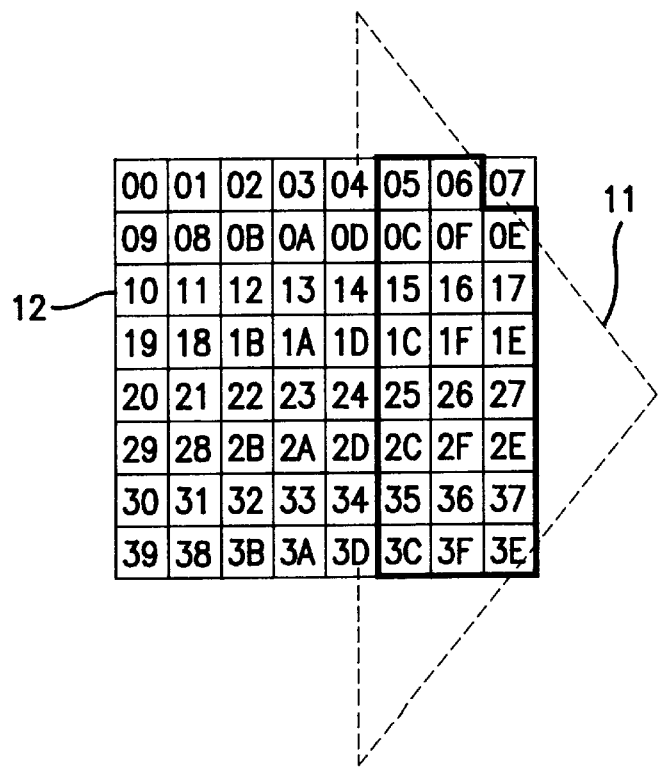

FIG. 8 is an arrangement diagram showing an example of the column-address arrangement in the block of the image generation apparatus of the present embodiment in FIG. 6 and FIG. 7. Here, the block is divided into rectangular segments through $2^3$ by $2^3$ division of longitudinal and lateral ways, a column address of the block: has bus width of 3+3=6 bits, the high order 3 bits and the low order 3 bits are assigned to a longitudinal address and a lateral address, respectively, the least significant bit (the first bit) of the lateral address of the block is used as the low order address which selects either one of DRAM 7 or 8.

For explanation of the operation we assume a case where address data of each segment of block 12 included in superposed image 11 are written on DRAMs 7, 8.

Figures 2, 3:
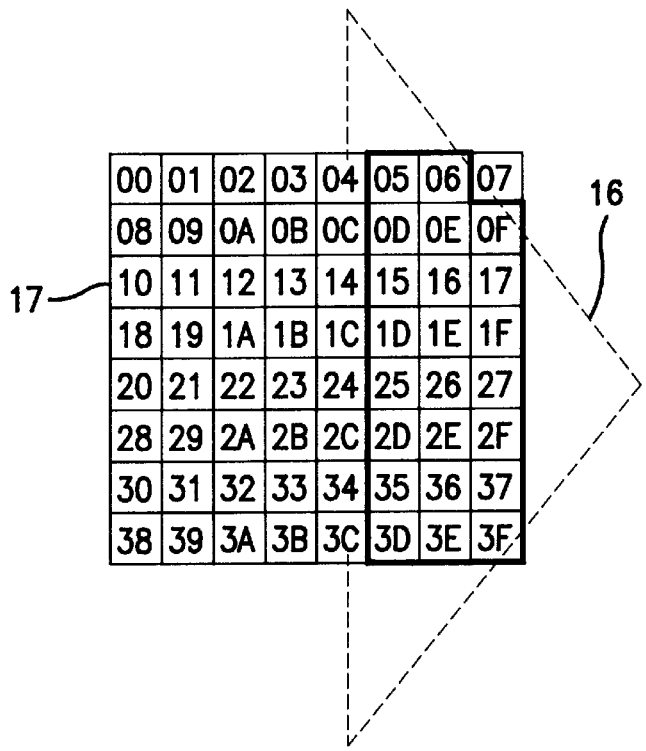
Figures 4, 5:
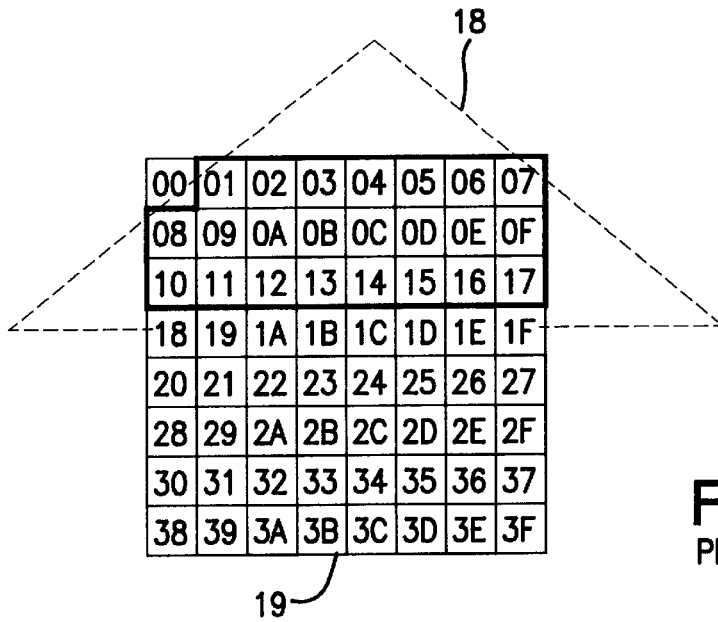

First, in pixel processing unit 1, as in the conventional image generation apparatus, address signals 50 which correspond to pixels in image 11 on the block are produced from upper left in the order of 05h, 06h, 0Dh, 0Eh, 0Fh, 15h, 16h, - - - , 37h, 3Dh, 3Eh, 3Fh as same as the case of FIG. 2 and are outputted pixel by pixel together with data signal 51 and write request signal 52.

The address signal 50 is logically transformed by low order address conversion circuit 2, and address signals 53 are outputted in the order of 05h, 06h, 0Ch, 0Fh, 0Eh, 15h, 16h, - - - , 37h, 3Ch, 3Fh, 3Eh as shown in FIG. 8.

At this time, in memory controller 9, input control signals 54 are outputted when the lateral least significant bit (the first bit) of address signal 53 is 0 such as 06h, 0Ch, - - - , 3Eh and also write request signal 52 becomes effective. Then address signal 53 and data signal 51 are temporarily held in address FIFO 3, data FIFO 5 in the address order of 06h, 0Ch, - - - , 3Eh. On the other hand, when the lateral least significant bit (the first bit) of address signal 53 is 1 such as 05h, 0Fh, 15h, - - - , 3Fh and also write request signal 52 becomes effective, input control signal 55 is outputted and address signal 53 and data signal 51 are temporarily held in address FIFO 4 and data FIFO 6 in the order of the address such as 05h, 0Fh, 15h, - - - , 3Fh.

Next, in memory controller 9, when there are data in FIFOs 3, 4 and at the same time DRAMs 7, 8 are in writable conditions, output control signal 56 and DRAM control signals 57, 58 are outputted. Now, when there is data in one of FIFOs 3, 4, then only one of DRAM control signals 57, 58 is outputted. Then, in accordance with output control signal 56, address signal 59 and data signal 61 are outputted in order from address FIFO 3 and data FIFO 5 to DRAM 7, and concurrently address signal 60 and data signal 62 are outputted in order from address FIFO 4 and data FIFO 6 to DRAM 8, and also DRAMs 7, 8 are write-controlled at the same timing according to DRAM control signals 57, 58.

Subsequently, in pixel processing unit 1, block processing completion signal 63 is outputted when the processing of one block is finished. When this block processing completion signal 63 becomes effective, output control signal 56 and DRAM control signals 57, 58 are outputted from memory controller 9, and data remained in address FIFOs 3, 4 and data FIFOs 5, 6 are outputted to DRAMs 7, 8 to be stored.

Figures 9, 10:
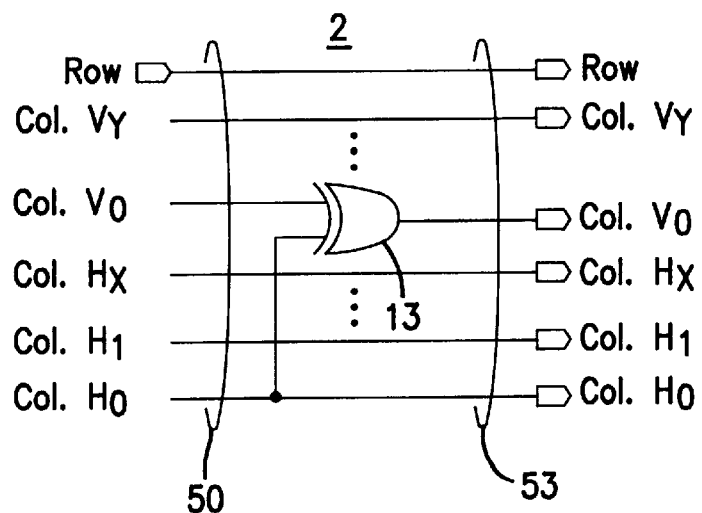

FIG. 9 is an explanation diagram showing an example of write access operation conducted to DRAMs 7, 8 under the column-address arrangement shown in FIG. 8, illustrating write access order to each DRAM 7, 8 and a column address of each DRAM 7, 8. Here, although the column for write access to DRAM 7 is recorded as unused only in the twelfth time, this means that DRAM control signal 57 is not issued and any write operation is not conducted to DRAM 7 at the twelfth time.

A second embodiment of the image generation apparatus of the present invention is described herein after.

The image generation apparatus of the present embodiment is obtained by replacing low order address conversion circuit 2 of the image generation apparatus of the first embodiment, and hence the explanation of the similar blocks will be omitted.

Figure 13:
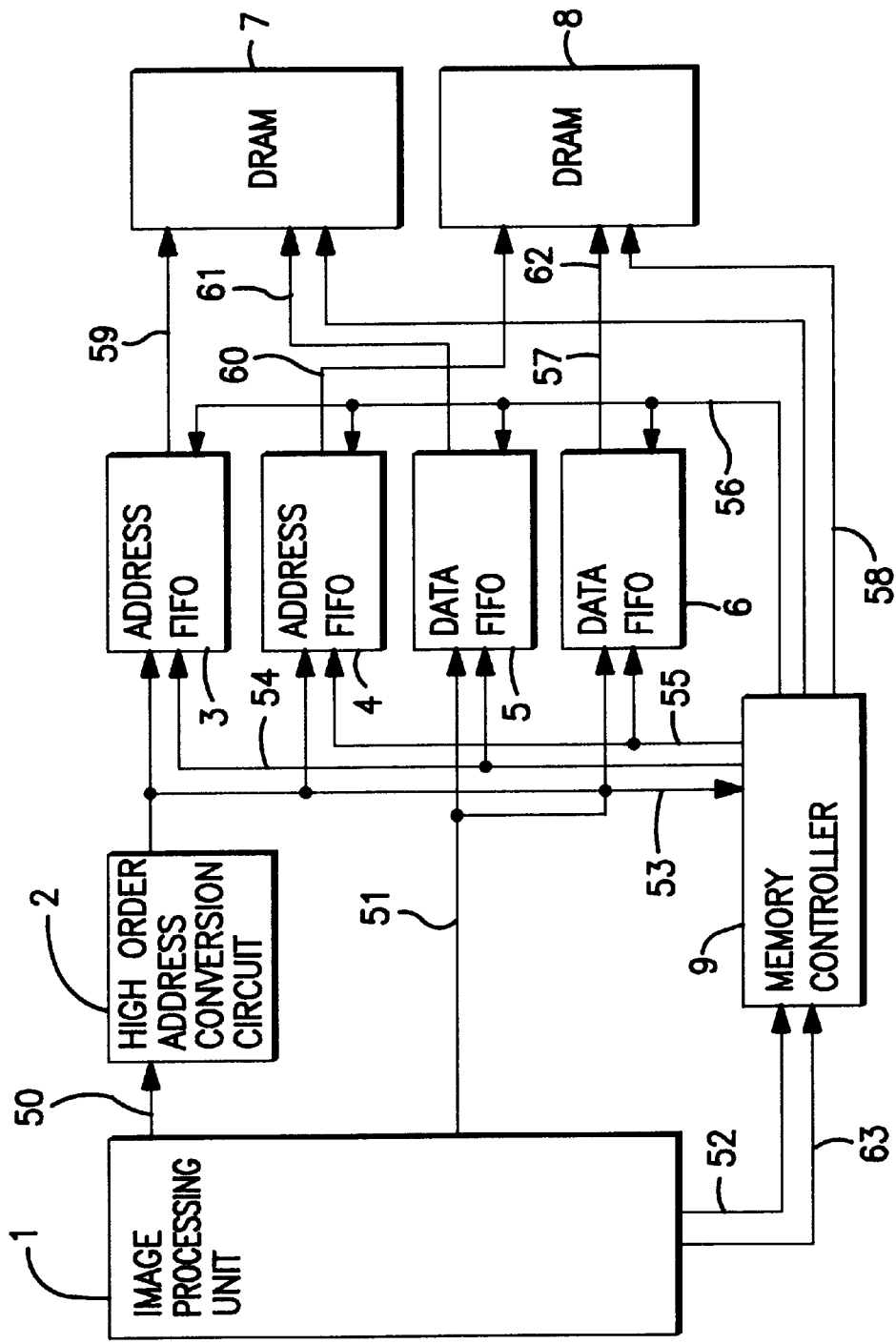

FIG. 10 is a circuit diagram showing high order address conversion circuit 10 of the second embodiment of the image generation apparatus of the present embodiment shown in FIG. 13. Referring to FIG. 10, low order address conversion circuit 2 provides EXOR circuit 13, receives address signal 50 and outputs address signal 53 which instructs to perform logical operation of the least significant bit $V_0$ of the longitudinal address signal (low order Y bits of column-address) in the block through exclusive OR (EXOR) with the least significant bit signal Ho of lateral address signal (high order X bits of column-address), and outputs the result of the EXOR operation as the least significant bit of the high order address signal.

Next, operation of the write control into the memory of the image generation apparatus of the present embodiment is described hereinafter.

Figures 11, 12:
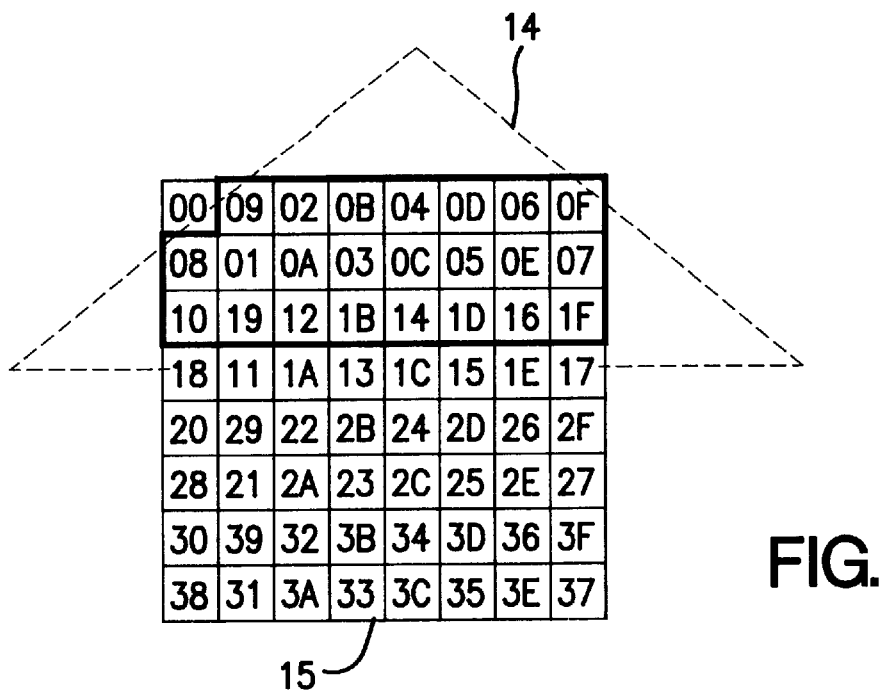

FIG. 11 is an arrangement diagram showing a column-address arrangement example in a block of the image generation apparatus of the present embodiment. Here, the block is divided into rectangular segments through $2^3$ by $2^3$ division of longitudinal and lateral lattice, a column address of each segment has bus width of 3+3=6 bits, the high order 3 bits and the low order 3 bits are assigned to a longitudinal address and a lateral address, respectively, and the least significant bit (the fourth bit) of the longitudinal address of each segment is used for selecting DRAM 7 or 8. For explanation of the operation, we assume a case where address data of each segment of block 15 included in superposed image 14 are written on DRAM 7, 8.

First, in pixel processing unit 1, as in the conventional image generation apparatus, address signals 50 which correspond to pixels in image 14 on the block are produced from upper left in the order of 01h, 02h, 03h, 04h, 05h, 06h, 07h, 08h, - - -, 14h, 15h, 16h, 17h shown as FIG. 2 and are outputted pixel by pixel together with data signal 51 and write request signal 52.

The address signal 50 is logically transformed by high order address conversion circuit 10 and address signals 53 are outputted in the order of 09h, 02h, 0Bh, 04h, 0Dh, 06h, 0Fh, 08h, - - -, 14h, 1Dh, 16h, 1Fh.

At this time, in memory controller 9, input control signal 54 is outputted when the longitudinal least significant bit (the fourth bit) of address signal 53 is 0 such as 02h, 04h, 06h, 01h, - - -, 16h, and also write request signal 52 becomes effective. Then address signal 53 and data signal 51 are temporarily held in address FIFO 3 and data FIFO 5 in the address order of 02h, 04h, 06h, 01h, - - -, 16h. On the other hand, when the longitudinal least significant bit (the fourth bit) of address signal 53 is 1 such as 09h, 0Bh, 0Dh, 0Fh, 08h, - - -, 1Fh, and also write request signal 52 becomes effective, input control signal 55 is outputted and address signal 53 and data signal 51 are temporarily held in address FIFO 4 and data FIFO 6 in the order of the address such as 09h, 0Bh, 0Dh, 0Fh, 08h, - - -, 1Fh.

Next, in memory controller 9, when there are data in FIFOs 3, 4 and at the same time DRAMs 7, 8 are in writable conditions, output control signal 56 and DRAM control signals 57, 58 are outputted. Now, when there is data in one of FIFOs 3, 4, then only one of DRAM control signals 57, 58 is outputted. Then, in accordance with output control signal 56, address signal 59 and data signal 61 are outputted in order from address FIFO 3 and data FIFO 5 to DRAM 7, and concurrently address signal 60 and data signal 62 are outputted in order from address FIFO 4 and data FIFO 6 to DRAM 8, and also DRAMs 7, 8 are write-controlled at the same timing according to DRAM control signals 57, 58.

Subsequently, in pixel processing unit 1, block processing completion signal 63 is outputted when the processing of one block is finished. When this block processing completion signal 63 becomes effective, output control signal 56 and DRAM control signals 57, 58 are outputted from memory controller 9, and data remained in address FIFOs 3, 4 and data FIFOs 5, 6 are outputted to DRAMs 7, 8 to be stored.

FIG. 12 is an explanation diagram showing an example of write access operation conducted to DRAMs 7, 8 under the column-address arrangement shown in FIG. 11, illustrating write access order to each DRAM 7, 8 and a column address of each DRAM 7, 8. Here, although column for write access to DRAM 7 is recorded as unused only in the twelfth time, this means that DRAM control signal 57 is not issued and any write operation is not conducted to DRAM 7 at the twelfth time.

In the image generation apparatus of embodiment 1 and embodiment 2 described above, DRAM write access frequency is reduced to 12 times from 15 times which is required for the conventional image generation apparatus shown in FIG. 9, with 20% reduction in the access frequency. In other words, the conventional image generation apparatus having a neck in memory access operation can be improved in operation speed by 20%.

As described above, the image generation apparatus of the present invention divides an image area into a plurality of rectangular block areas, logically transforms an address signal which corresponds to each pixel within the same block, distributes each pixel data by means of the transformed address signal to store in a plurality of DRAMs. By assigning an unconsecutive column address in the same low order address to each address signal, pixels which access to the same DRAM can be arranged so that they do not reside consecutively in the border area of the block, consequently reducing the bias in the access frequency concerning each DRAM for each completion per block. Therefore, the access frequency to each DRAM can be reduced, the storing of the image can be utilized to the satisfactory level, and thus it becomes possible to achieve the high speed image generation.

What is claimed is:

1. An image generation method comprising the steps of:

dividing an area of written image into a plurality of rectangular blocks;

subdividing each of said blocks longitudinally and laterally into a plurality of rectangular segments corresponding to pixels of the image;

assigning binary data which represent an address of each pixel as a basic address signal;

bisecting the basic binary data of basic address signal into a high order address signal bits for longitudinal address and a low order address signal bits for the lateral address;

outputting a result of exclusive OR of least significant bits of high and low order address signal bits of basic address signal;

converting the arrangement of pixels by replacing the least significant bit of the low order address signal bits with the outputted result of the exclusive OR;

separating the pixels into two groups according to the value of the least significant bit of the low order address signal bits after the replacement;

storing temporarily the separated pixels with their basic addresses into correspondigly separated FIFOS;

storing the pixels with its basic addresses stored in the FIFOs into two DRAMs separated in accordance with the same separation discrimination mode, sequentially in parallel; and outputting the pixels stored in the separated DRAMs according to the corresponding basic addresses.

2. An image generation method comprising the steps of:

dividing an area of written image into a plurality of rectangular blocks;

subdividing each of said blocks longitudinally and laterally into a plurality of rectangular segments corresponding to pixels of the image;

assigning binary data which represent an address of each pixel as a basic address signal;

bisecting the basic binary data of basic address signal into a high order address signal bits for longitudinal address and a low order address signal bits for the lateral address;

outputting a result of exclusive OR of least significant bits of high and low order address signal bits of basic address signal;

converting the arrangement of pixels by replacing the least significant bit of the high order address signal bit with the outputted result of the exclusive OR;

separating the pixels into two groups according to the value of the least significant bit of the high order address signal bits after the replacement;

storing temporarily the separated pixels with their basic addresses into correspondingly separated FIFOs;

storing the pixels with its basic addresses stored in the FIFOs into two DRAMS separated in accordance with the same separation discrimination mode, sequentially in parallel; and outputting the pixels stored in the separated DRAMS according to the corresponding basic addresses.

3. An image generation apparatus comprising:

a pixel processing unit for dividing an area of written image into a plurality of rectangular blocks, producing a basic address signal in binary code including longitudinal and lateral address signal bits as a high order address signal bits and a low order address signal bits respectively for each pixel within a block and outputting the address signal and corresponding pixel data pixel by pixel as a data signal;

memory means comprising a plurality of DRAMs for storing each address data and pixel data which corresponds to said each pixel in accordance with the difference of the least significant bit of the low order address signal of said basic address signal;

a plurality of FIFOs for storing said address signal and said pixel data separated according to the difference of the least significant bit of said low order address signal for corresponding DRAMs intermediately at the writing to the memory means;

a low order address conversion circuit for receiving said address signal, performing an exclusive OR operation among least significant bits of the high order address signal and the low order address signal and replacing with the result of the logical operation the least significant bit of the low order address signals; and a memory control circuit for receiving the address data from the low order address conversion circuit, discriminating the least significant bit of the low order address signal, storing address data and corresponding pixel data to the corresponding FIFOs respectively according to the least significant bit, writing the address data and pixel data stored in the FIFOs into the corresponding DRAMs when detecting the data within the FIFOs in the same timing for each FIFOs and clearing by writing all remained data in FIFOs for every block.

4. An image generation apparatus comprising:

a pixel processing unit for dividing an area of written image into a plurality of rectangular blocks, producing a basic address signal in birary code including longitudinal and lateral address signal bits as a high order address signal bits and a low order address bits respectively for each pixel within a block and outputting the address signal and corresponding pixel data pixel by pixel as a data signal;

memory means comprising a plurality of DRAMs for storing each address data and pixel data which corresponds to said each pixel in accordance with the difference of the least significant bit of the high order address signal bits of said basic address signal;

a plurality of FIFOs for storing said address signals and said pixel data separated according to the difference of the least significant bit of said high order address signal bits for corresponding DRAMs intermediately at the writing to the memory means;

a high order address conversion circuit for receiving said address signal, performing an exclusive OR operation among least significant bits of the high order address signal and the low order address signal and replacing with the result of the logical operation the least significant bit of the high order address signals; and a memory control circuit for receiving the address data from the high order address conversion circuit, discriminating the least significant bit of the high order address signal, storing address data and corresponding pixel data to the corresponding FIFOs respectively according to the least significant bit, writing the address data and pixel data stored in the FIFOs into the corresponding DRAMs when detecting the data within the FIFOs in the same timing for each FIFOs and clearing by writing all data remained in FIFOs for every block.

* * * * *